(12) United States Patent
Lagger et al.

(10) Patent No.: US 11,592,093 B2
(45) Date of Patent: Feb. 28, 2023

(54) GEARED ROTARY POWER DISTRIBUTION UNIT WITH MECHANICAL DIFFERENTIAL GEARING FOR MULTIPLE ACTUATOR SYSTEMS

(71) Applicant: Woodward, Inc., Fort Collins, CO (US)

(72) Inventors: Thomas Lagger, Niles, IL (US); Paul Smith, Park Ridge, IL (US); Mariusz Kuczaj, Chicago, IL (US); Roy Romana, Chicago, IL (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 17/080,573

(22) Filed: Oct. 26, 2020

(65) Prior Publication Data
US 2021/0140526 A1 May 13, 2021

Related U.S. Application Data

(63) Continuation of application No. 16/143,335, filed on Sep. 26, 2018, now Pat. No. 10,816,070.

(51) Int. Cl.
*F16H 48/05* (2012.01)
*F16D 7/00* (2006.01)
(Continued)

(52) U.S. Cl.
CPC ............. *F16H 48/05* (2013.01); *B64D 29/08* (2013.01); *F01D 25/24* (2013.01);
(Continued)

(58) Field of Classification Search
CPC ............... F16H 48/05; F16H 2037/048; F16H 37/0806; F16H 48/10; F16H 37/082;
(Continued)

(56) References Cited

U.S. PATENT DOCUMENTS

| 6,494,033 | B1 | 12/2002 | Davies |
| 7,527,574 | B2 * | 5/2009 | Han ..................... B60K 17/046 |
| | | | 475/198 |

(Continued)

OTHER PUBLICATIONS

Notification of Transmittal of The International Search Report and The Written Opinion of the International Searching Authority, or The Declaration, for International Application No. PCT/US19/52850, dated Dec. 10, 2019.

(Continued)

*Primary Examiner* — Roger L Pang
(74) *Attorney, Agent, or Firm* — McAndrews Held & Malloy, Ltd.

(57) ABSTRACT

Methods and systems for nacelle door electromechanical actuation may include a power distribution unit comprising a motor and differential gears; and a plurality of electromechanical actuators, each coupled to an output of a corresponding one of the differential gears. Each of the electromechanical actuators may include a configurable brake and a mechanical output, where the power distribution unit may provide mechanical torque to one of the electromechanical actuators via the motor and the differential gears based on configuration of the configurable brakes in each of the electromechanical actuators. At least one of the configurable brakes may be an electrically configurable brake. At least one of the configurable brakes may be a mechanically configurable brake. The differential gears may include two or more differential gears for receiving an input torque and supplying an output torque to one of a plurality of outputs of the differential gears.

19 Claims, 9 Drawing Sheets

(51) Int. Cl.
   *F16D 43/20* (2006.01)
   *B64D 29/08* (2006.01)
   *F01D 25/24* (2006.01)
   *F16H 37/04* (2006.01)
   *F16H 37/08* (2006.01)
   *F16H 48/10* (2012.01)

(52) U.S. Cl.
   CPC ...... *F05D 2220/32* (2013.01); *F05D 2260/53* (2013.01); *F16D 7/00* (2013.01); *F16D 43/20* (2013.01); *F16H 37/082* (2013.01); *F16H 37/0806* (2013.01); *F16H 37/0813* (2013.01); *F16H 48/10* (2013.01); *F16H 2037/048* (2013.01)

(58) Field of Classification Search
   CPC ........ F16H 37/0813; F16D 7/00; F16D 43/20; F05D 2260/53; F05D 2270/62; F05D 2230/72; F05D 2200/32; B64D 29/08; B64D 29/00; B64D 29/06
   USPC ................. 475/199, 221, 204, 248; 180/272
   See application file for complete search history.

(56) References Cited

U.S. PATENT DOCUMENTS

| | | | |
|---|---|---|---|
| 8,132,763 B2* | 3/2012 | Schievelbusch | B64D 45/0005 244/215 |
| 10,816,070 B2* | 10/2020 | Lagger | F02C 7/00 |
| 11,427,079 B1* | 8/2022 | Weisz | B60K 17/02 |
| 2003/0192987 A1 | 10/2003 | Ahrendt et al. | |
| 2005/0288146 A1* | 12/2005 | Englisch | B60W 10/06 477/2 |
| 2007/0213160 A1* | 9/2007 | Lyons | B60K 7/0007 475/5 |
| 2008/0084130 A1 | 4/2008 | Darby et al. | |
| 2008/0300080 A1* | 12/2008 | Thompson | B62D 11/14 475/18 |
| 2009/0160274 A1* | 6/2009 | Aikawa | B60K 17/16 310/83 |
| 2010/0205931 A1 | 8/2010 | Baudu et al. | |
| 2011/0014043 A1 | 1/2011 | Pereira et al. | |
| 2012/0259483 A1 | 8/2012 | Villano et al. | |
| 2013/0281249 A1* | 10/2013 | Mimura | F16H 37/0813 475/150 |
| 2014/0230584 A1 | 8/2014 | Hudson et al. | |
| 2015/0176529 A1* | 6/2015 | Todorovic | F02K 1/72 239/265.19 |
| 2016/0229546 A1* | 8/2016 | Chavignier | F16H 25/2204 |
| 2017/0082182 A1* | 3/2017 | Kurihara | F16D 55/00 |
| 2019/0135447 A1* | 5/2019 | John | B64D 29/08 |
| 2019/0255895 A1* | 8/2019 | Sanborn | B60T 13/686 |
| 2020/0171940 A1* | 6/2020 | Ohlig | F16H 63/486 |
| 2020/0370632 A1* | 11/2020 | Romana | F16H 48/10 |

OTHER PUBLICATIONS

Notification of Transmittal of The International Search Report and The Written Opinion of the International Searching Authority, or The Declaration, for International Application No. PCT/US19/52850, dated Apr. 9, 2021.

* cited by examiner

GEARED ROTARY POWER DISTRIBUTION UNIT WITH MECHANICAL DIFFERENTIAL GEARING FOR MULTIPLE ACTUATOR SYSTEMS

PRIORITY CLAIM/INCORPORATION BY REFERENCE

This application is a continuation of application Ser. No. 16/143,335 filed on Sep. 26, 2018, now U.S. Pat. No. 10,816,070, which is hereby incorporated herein by reference in its entirety.

FIELD

Certain embodiments of the disclosure relate to electromechanical actuators. More specifically, certain embodiments of the disclosure relate to a geared rotary power distribution unit with mechanical differential gearing for multiple actuator systems.

BACKGROUND

Existing devices for providing electromechanical actuators are costly, heavy, and take valuable space in a turbine nacelle. Electromechanical actuators may be used to open aircraft nacelle doors providing access to the turbine for maintenance, for example.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method is provided for a geared rotary power distribution unit with mechanical differential gearing for multiple actuator systems, substantially as shown in and/or described in connection with at least one of the figures, as set forth more completely in the claims.

These and various other advantages, aspects and novel features of the present disclosure, as well as details of an illustrated embodiment thereof, will be more fully understood from the following description and drawings.

DETAILED DESCRIPTION

As utilized herein, "and/or" means any one or more of the items in the list joined by "and/or". For example, "x and/or y" means any element of the three-element set {(x), (y), (x, y)}. Similarly, "x, y, and/or z" means any element of the seven-element set {(x), (y), (z), (x, y), (x, z), (y, z), (x, y, z)}. As utilized herein, the term "module" refers to functions than can be implemented in hardware, software, firmware, or any combination of one or more thereof. As utilized herein, the term "exemplary" means serving as a non-limiting example, instance, or illustration.

Figure 1:
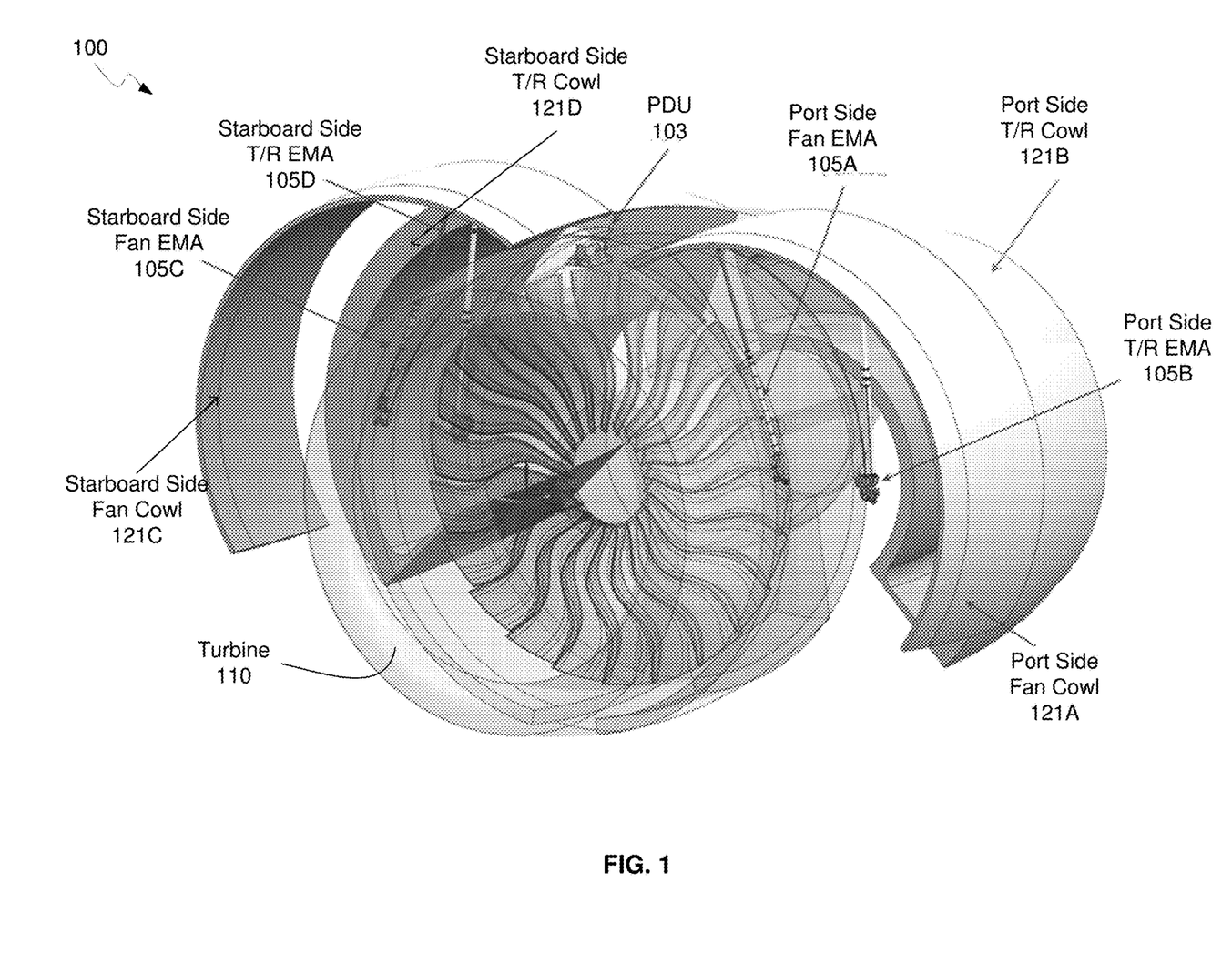
FIG. 1 illustrates a turbine nacelle with operable cowls, which may be used in accordance with various implementations of the disclosure.

FIG. 1 illustrates a turbine nacelle with operable cowls, which may be used in accordance with various implementations of the disclosure. Referring to FIG. 1, there is shown turbine nacelle 100 comprising turbine 110 encased by cowls 121A-121D, where in this example scenario, cowls 121A and 121C comprise port and starboard side fan cowls, respectively, and cowls 121B and 121D comprise port and starboard side thrust/reverse (T/R) cowls. The cowls may be opened for maintenance or inspection purposes, and may be coupled to electromechanical actuators (EMAs) 105A-105D to enable this actuation. The EMAs 105A-105D may comprise power screws with electrical control for physically moving a structure when an electrical signal and mechanical torque is applied to the EMA 105A-105D.

There is also shown a power distribution drive unit (PDU) 103 that is operable to actuate the EMAs 105A-105D. To conserve space within the nacelle 100, a single PDU 103 is operable to control multiple EMAs, such as EMAs 105A-105D, as opposed to each actuator containing a motor and controller. Previous cowl door EMA systems have utilized EMAS each with a motor and controller. Electro-mechanical clutches comprise one method to connect or disconnect the drive trains of the actuators. Electro-mechanical brakes are still required in these systems as they serve the function to hold the doors in position when opened. As each actuator would require an electro-mechanical clutch, this results in additional wires in the cable harnesses, lower reliability and overall higher system weight.

In an example embodiment of the disclosure, the actuation system in the nacelle 100 comprises the PDU 103 comprising an electric motor; an electronic control unit (ECU); differential gearing; torque shafts; actuators with electro-mechanical brakes, speed reducing gearing, position sensors; power screws; and user interface push button controls. The combination of the differential gearing, electro-mechanical brakes and the control unit act as an actuator selector mechanism, as is described further with respect to FIGS. 2-9.

The system includes the use of differential gearing arranged in a specific configuration combined with dual purpose electro-mechanical brakes (grounding the legs of the differential(s) and holding the actuator open position) and the ECUs logic to command the actuators. While the example shown here is for nacelle doors, the general concept has applicability beyond nacelle systems such as for cargo door actuation, door locking, landing gear doors, etc.

Figure 2:
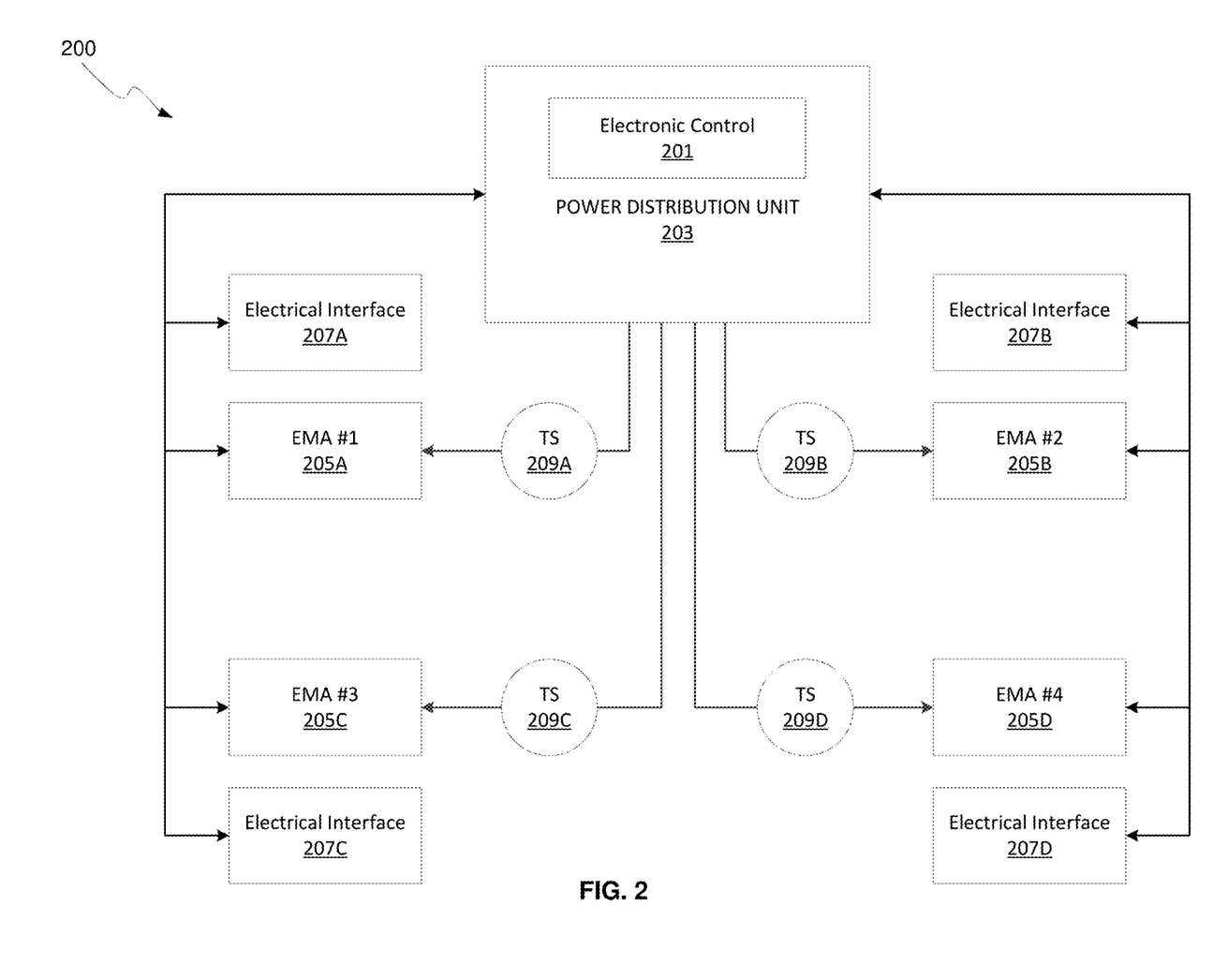
FIG. 2 illustrates a schematic of an electromechanical actuator control system, in accordance with an example embodiment of the disclosure.

FIG. 2 illustrates a schematic of an electromechanical actuator control system, in accordance with an example embodiment of the disclosure. Referring to FIG. 2, there is shown control system 200 comprising an electronic control unit 201, power distribution unit (PDU) 203, EMAs 205A-205D, electrical interfaces 207A-207D, and torque shafts 209A-209D.

The electronic control unit 201 may comprise an electronic control processor, for example, that is operable to receive input signals from sensors and limit switches in the EMAs 205A-205D or other parts of the nacelle, and also receive user inputs such as from the electrical interfaces 207A-207D. The electronic control unit 201 may provide output signals to the EMAs 205A-205D via the power distribution unit 203. The electronic control unit 201 may be within or coupled adjacent to the power distribution unit 203.

The PDU 203 may comprise electrical and mechanical components for providing electrical signals to the EMAs 205A-205D and mechanical energy to the EMAs 205A-205D via the torque shafts 209A-209D. The torque shafts 209A-209D may comprise flex shafts, for example, that transfer torque from the PDU 203 to the EMAs 205A-205D with the ability to bend as needed in confined spaces within the nacelle.

The electrical interfaces 207A-207D may comprise electronic or electromechanical switches for indicating when a nacelle door should be opened or closed. This may comprise a control panel of switches, a touchscreen display, or discrete buttons or switches, for example. Differential gearing in the power distribution unit 203 may enable multiple EMAs to be driven by a single PDU. Each EMA 205A-205D may comprise an electrically configurable brake for locking, or "grounding," each output of the differential gearing, so that only the EMA with its brake disengaged receives mechanical drive torque via its torque shaft 209A-209D.

In operation, a user may press a button on a control panel coupled to or part of the electrical interfaces 207A-207D, sending a control signal from the respective electrical interface to the electronic control unit 201 in or coupled to the power distribution unit 203. The electronic control unit 201 may then send an electrical signal to the corresponding EMA of the EMAs 205A-205D and engage a motor in the PDU 203. The electrical signal sent to the EMA may disengage a brake such that the differential gearing in the PDU 203 can provide torque provided by the motor to the activated EMA. This is described further with respect to FIGS. 3-9.

Figure 3:
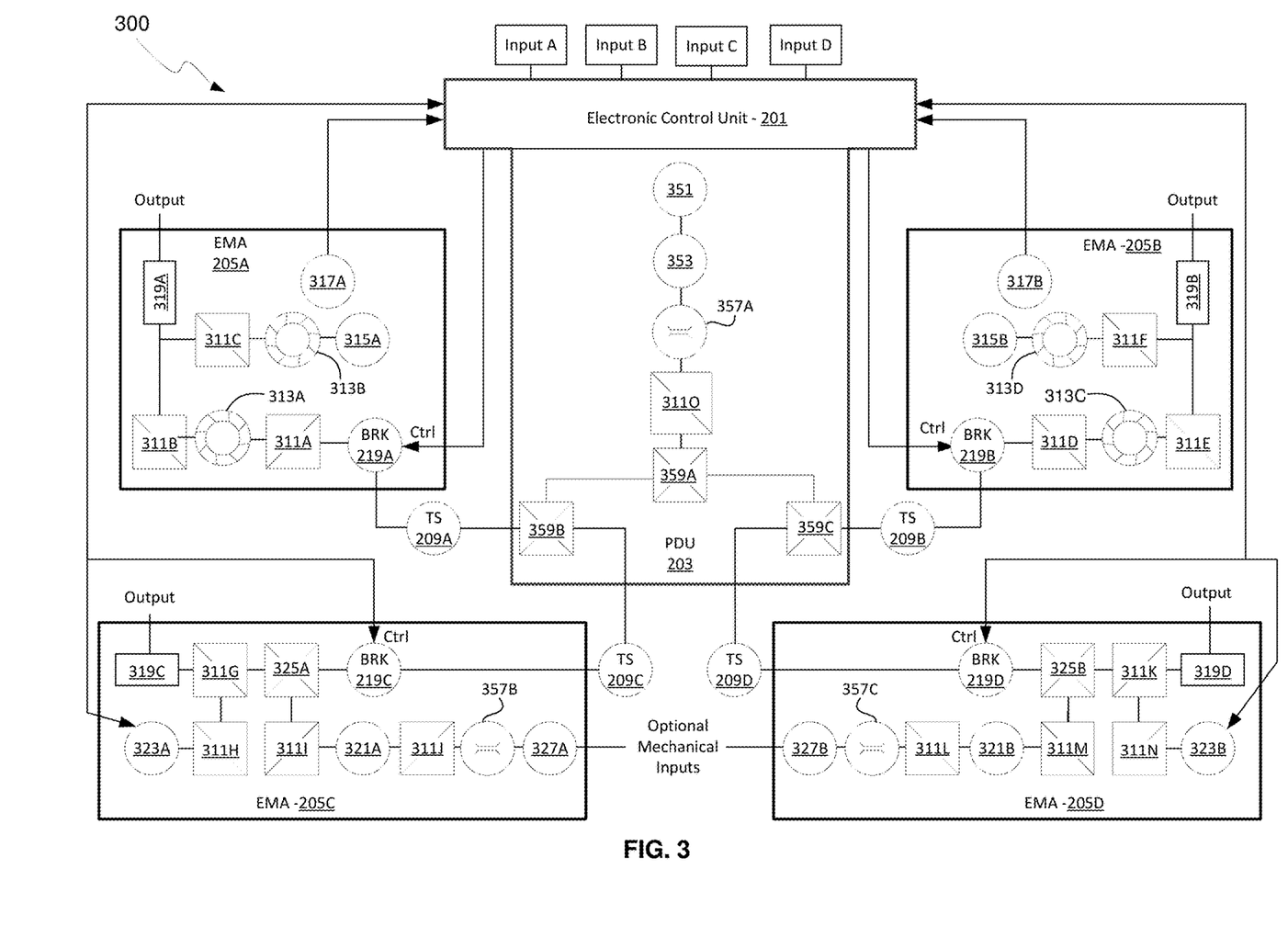
FIG. 3 illustrates a detailed schematic of an electromechanical actuator control system, in accordance with an example embodiment of the disclosure.

FIG. 3 illustrates a detailed schematic of an electromechanical actuator control system, in accordance with an example embodiment of the disclosure. Referring to FIG. 3, there is shown control system 300 comprising the electronic control unit 201, PDU 203, EMAs 205A-205C, and torque shafts 209A-209D. The electronic control unit 201 may comprise a processor, for example, and associated electronics, for receiving input signals and generating output signals to the PDU 203 based on programming stored in the electronic control unit 201.

The PDU 203 may comprise a Hall effect sensor 351, motor 353, slip clutch 357A, gear ratio 3110, and differential gears 359A-359C. The Hall effect sensor 351 may comprise one or more magnetic field sensors for enabling commutation of brushless DC motors, sensing the position of the rotor with respect to the stator in the motor so that the appropriate stator windings may be energized to provide desired torque.

The Hall effect sensor 351 may be coupled to or integrated within the motor 353, for example.

In an example scenario, the motor 353 may comprise an electrical, hydraulic, or pneumatic motor. In the case of electric motors, it may comprise a brushless DC motor, brushed DC motor, AC Induction motor, or stepper motor, although other motors may be utilized based on available space and power requirements, for example. The motor 353 may be controlled by the electronic control unit 201 and the Hall effect sensor 351, and may provide torque for the EMAs 205A-205D via the slip clutch 357A, gear ratio 3110, differential gears 359A-359D. The slip clutch 357A may limit the torque from the motor 353 to avoid excessive torque being provided.

The gear ratio 3110 may comprise a mechanical gear component with a gear ratio between input and output shafts so as to step up or down the rotational speed. In this example, the gear ratio 3110 comprises a step-down gear ratio of about 8:1, although other gear ratios may be used based on motor speed and desired output speed.

The differential gears 359A-359C comprise epicyclic gearing assemblies, where gears may be mounted such that one gear revolves around another, with an input shaft and two output shafts. Which output shaft is rotating is determined by the state of a brake in each of the EMAs 205A-205D. For example, when one of the EMAs 205A-205D has a brake disengaged, that torque shaft will rotate while the others are "grounded," meaning the brakes are engaged, and if all output EMAs have brakes engaged, there is no rotation in any torque shaft 209A-209D. The differential gears 359A-359C may be configured to only allow torque to be transferred to one output shaft at a time, so that only one cowl door is actuated at a time. In the example shown in FIG. 3, one input torque from the motor 353 may be delivered to one of four output shafts 209A-209D using three differential gears 359A-359C, although other numbers of differential gears and output shafts are possible. The configurable brakes 219A-219D may comprise electrically or mechanically configurable brakes. Electrical brakes may be actuated by applying or removing power to their inputs, thereby engaging or disengaging the braking action. Mechanical brakes may be configured by mechanical force, such as by applying linear or rotational force to an input of the brakes 219A-219D.

The EMAs 205A and 205B may comprise fan cowl actuators, for example, and may comprise configurable brakes 219A and 219B, gear ratios 311A-311F, one-way clutches 313A-313D, dampers 315A and 315B, limit switches 317A and 317B, and ball screws 319A and 319B. In one example, the configurable brakes 219A and 219B may comprise power on brakes that are engaged by applying power to their inputs. In another example, the brakes 219A and 219B may comprise power off brakes that are disengaged by applying power to their inputs. The power may be applied to the brakes 219A and 2198 by the electronic control unit 201.

The one-way clutches 313A-313D comprise a clutch mechanism that engages in rotation in one direction so as to allow the cowl to open by hand, such as by manually lifting the cowl, with the ball screws 319A and 319B therefore rotating even with brakes 219A and 219B still engaged. The dampers 315A and 315B may comprise a mechanical dampening device that provides a resistance to the manual opening of the cowls coupled to the EMAs 205A and 205B to reduce the speed of opening and closing of the cowl.

The gear ratios 311A-311F comprise gear boxes with different gear ratios for different input/output shaft rotation speeds, allowing for a step-down or step-up of rotation speed from the input rotation speed. The ball screws 319A-319D, utilized in each of the EMAs 205A-205D, may comprise a rotational-to-linear actuator in that rotational torque on an input shaft results in linear motion of an output shaft, thereby enabling the opening or closing of the cowl attached to the activated EMA of the EMAs 205A-205D. The limit switches 317A and 317B may comprise electromechanical switches or other sensors for determining when the ball screws 319A and 319B are at desired positions, i.e., completely open or closed, so as to indicate to the electronic control unit 201 that it may disengage the motor 353 and re-engage the brakes 219A and 219B.

The EMAs 205C and 205D may comprise T/R cowl actuators, for example, and may comprise brakes 219C and 219D, gear ratios 311G-311N, ball screws 319C and 319D, friction brakes 321A and 321B, resolvers 323A and 323B, hybrid gearheads 325A and 325B, mechanical inputs 327A and 327B, and slip clutches 357B and 357C. The brakes 219A and 219B may comprise electrically or mechanically configurable brakes. In one example, the brakes 219C and 219D comprise power-off brakes that disengage with power applied and stay engaged with no power applied. In another example, the brakes 219C and 219D comprise power off brakes that are disengaged by applying power to their inputs. The power may be applied to the brakes 219C and 219D by the electronic control unit 201.

The mechanical inputs 327A and 327B comprise ports where an external source of torque may be applied to manually open the cowls, such as using a power-drill type device. In this case, the hybrid gearheads 325A and 325B couple torque from the mechanical inputs 327A and 327B, respectively, to the ball screws 319C and 319D, as opposed to normal input from the PDU 203 powering the ball screws 319C and 319D.

The slip clutches 357B and 357C may limit the torque received from the mechanical inputs 327A and 327B to avoid excessive torque being provided to the ball screws 319C and 319D. The friction brakes 321A and 321B comprise braking mechanisms that provide a resistance to back-rotation, such that the cowls would not suddenly close after torque is removed at the mechanical inputs 327A and/or 327B, for example. The resolvers 323A and 323B may comprise switches or other sensors for determining the position of the ball screw 319C and 319D, so that it may be moved to a desired position.

In operation, each of the EMAs 205A-205D may be individually enabled by the individual actuation of the brakes 219A-219D and supplying torque from the motor 353, as is further discussed with respect to FIGS. 4-7. While four EMAs is shown in the example of FIGS. 4-9, any number of EMAs may be used depending on the differential gearing utilized and number of outputs desired, for example.

Figure 4:
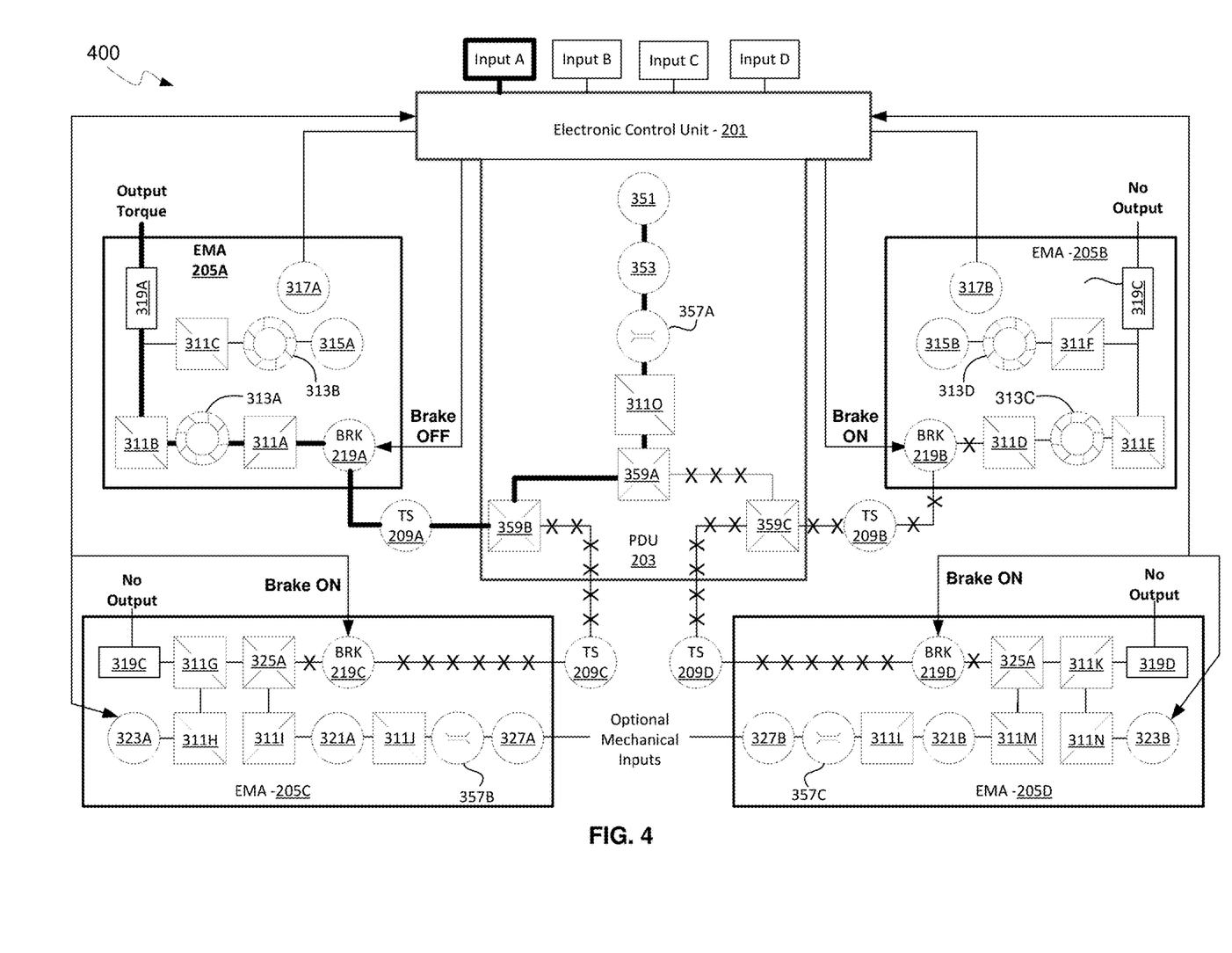
FIG. 4 illustrates the activation of a first electromechanical actuator, in accordance with an example embodiment of the disclosure.

FIG. 4 illustrates the activation of a first electromechanical actuator, in accordance with an example embodiment of the disclosure. Referring to FIG. 4, there is shown control system 400 with EMA 205A actuated. Input A is highlighted, indicating that it has been selected by a user through a touchscreen or push button, for example. This activation indicates to the electronic control unit 201 to activate the motor 353 and also to engage/disengage the appropriate brakes 219A-219D.

The brake activation/deactivation is illustrated by the Brake ON or Brake OFF on each of the electrical control lines to the brakes 219A-219D, where the brakes may be activated by the application of power or a physical force, or disengaged by application of power or physical force, configured by the electronic control unit 201. In this example, brake 219A is disengaged while brakes 219B-219D engaged by appropriate signals from the electronic control unit 201. In this state, both legs of differential gear 359C and the right legs of differential gears 359A and 359B are grounded so that torque from the motor 353 is supplied to the EMA 205A via the left leg of differential gear 359B and the torque shaft 209A, as indicated by the bold lines in and between the PDU 203 and EMA 205A, indicating the path of supplied torque.

The gear ratios 311A and 311B configure the torque supplied to the ball screw 319A to the desired rotation speed and torque, while the one-way clutch 313A prevents back-rotation. The limit switch 317A determines when the ball screw 319A has reached the desired position so that the electronic control unit 201 can stop motor actuation and engage brake 219A. With the brakes 219B-219D engaged, no torque is supplied to the EMAs 205B-205D, as indicated by the X's in the lines in and between the PDU 203 and EMAs 205B-205D.

Figure 5:
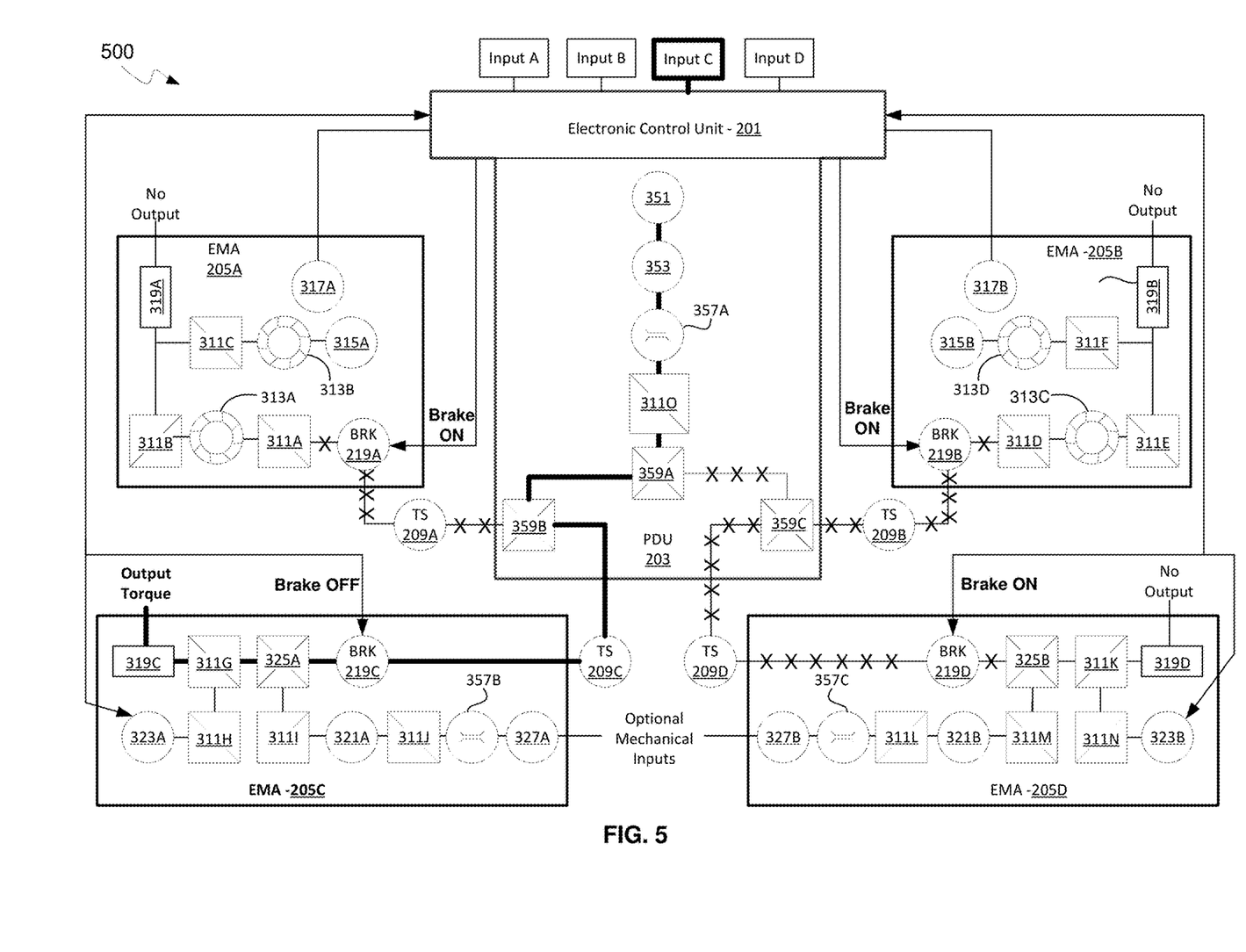
FIG. 5 illustrates the activation of a second electromechanical actuator, in accordance with an example embodiment of the disclosure.

FIG. 5 illustrates the activation of a second electromechanical actuator, in accordance with an example embodiment of the disclosure. Referring to FIG. 5, there is shown control system 500 with EMA 205C actuated. Input C is highlighted, indicating that it has been selected by a user through a touchscreen or push button, for example. This activation indicates to the electronic control unit 201 to activate the motor 353 and also to engage/disengage the appropriate brakes 219A-219D.

The brake activation/deactivation is illustrated by the Brake ON or Brake OFF on each of the control lines to the brakes 219A-219D, where the brake 219C is disengaged, while the brakes 219A, 219B, and 219D are engaged by appropriate signals from the electronic control unit 201 as shown. In this state, both legs of differential gear 359C, the right leg of differential gear 359A, and the left leg of differential gear 359B are grounded so that torque from the motor 353 is supplied to the EMA 205C via the right leg of differential gear 359B and the torque shaft 209C, as indicated by the bold lines in and between the PDU 203 and EMA 205C, indicating the path of supplied torque.

The gear ratio 311G and hybrid gearhead 325A configure the torque supplied to the ball screw 319C to the desired rotation speed and torque, while the resolver 323A determines the position of the ball screw 319C so that it is moved to a desired position. With the brakes 219A, 219B, and 219D engaged, no torque is supplied to the EMAs 205A, 205B, and 205D, as indicated by the X's in the lines in and between the PDU 203 and EMAs 205A, 205B, and 205D.

Figure 6:
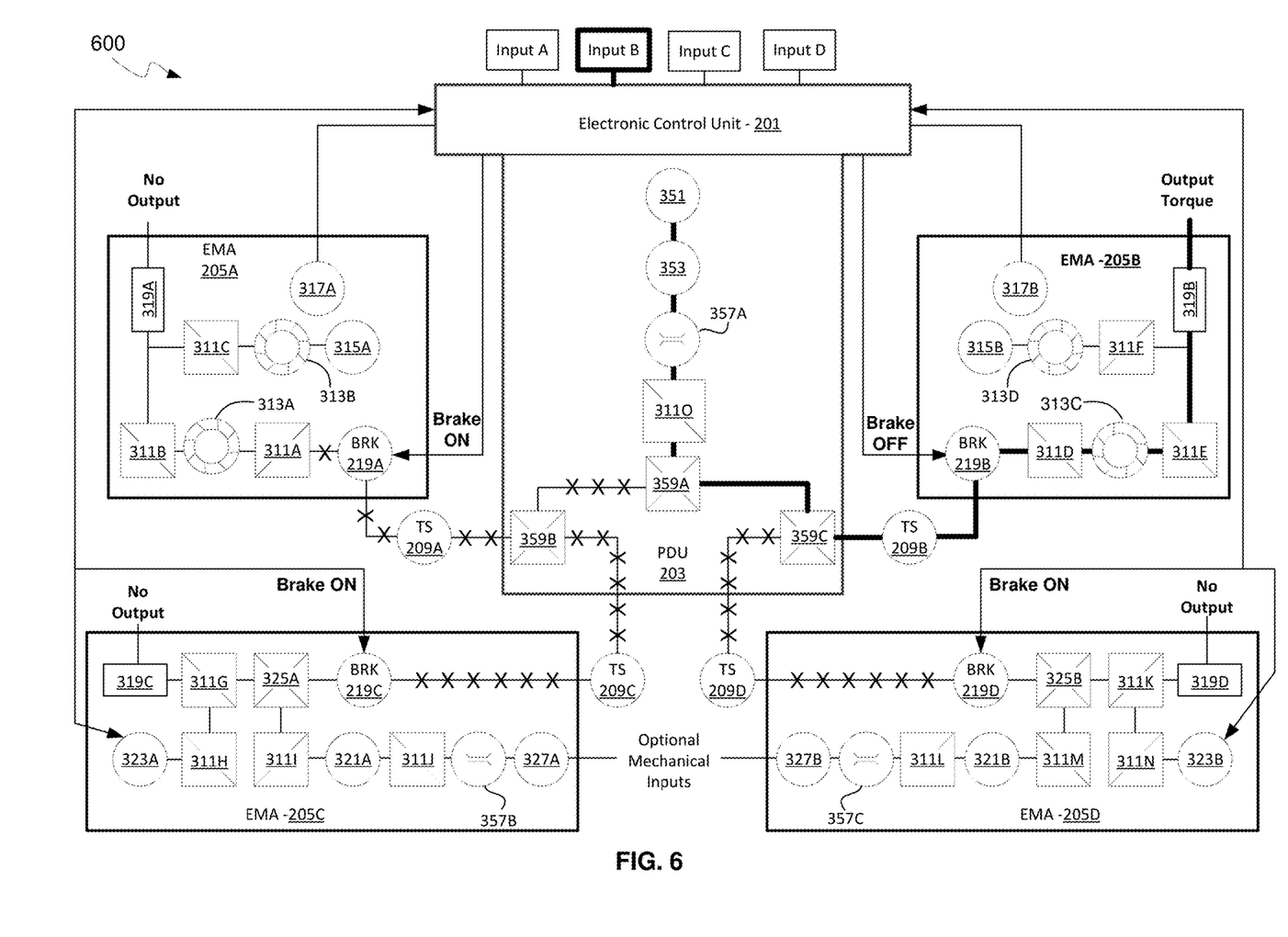
FIG. 6 illustrates the activation of a third electromechanical actuator, in accordance with an example embodiment of the disclosure.

FIG. 6 illustrates the activation of a third electromechanical actuator, in accordance with an example embodiment of the disclosure. Referring to FIG. 6, there is shown control system 600 with EMA 205B actuated. Input B is highlighted, indicating that it has been selected by a user through a touchscreen or push button, for example. This activation indicates to the electronic control unit 201 to activate the motor 353 and also to engage/disengage the appropriate brakes 219A-219D.

The brake activation/deactivation is illustrated by the Brake ON or Brake OFF on each of the lines to the brakes 219A-219D, where the brake 219B is disengaged while brakes 219A, 219C, and 219D are engaged by appropriate signals from the electronic control unit 201 as shown. In this state, both legs of differential gear 359B and the left legs of differential gears 359A and 359C are grounded so that torque from the motor 353 is supplied to the EMA 205B via the right leg of differential gear 359C and the torque shaft 209B, as indicated by the bold lines in and between the PDU 203 and EMA 205B, indicating the path of supplied torque.

The gear ratios 311D and 311E configure the torque supplied to the ball screw 319B to the desired rotation speed and torque, while the one-way clutch 313C prevents back-rotation. The limit switch 317B determines when the ball screw 319B has reached the desired position so that the electronic control unit 201 can stop motor actuation and reengage brake 219B. With the brakes 219A, 219C, and 219D engaged, no torque is supplied to the EMAs 205A, 205C, and 205D, as indicated by the X's in the lines in and between the PDU 203 and EMAs 205A, 205C, and 205D.

Figure 7:
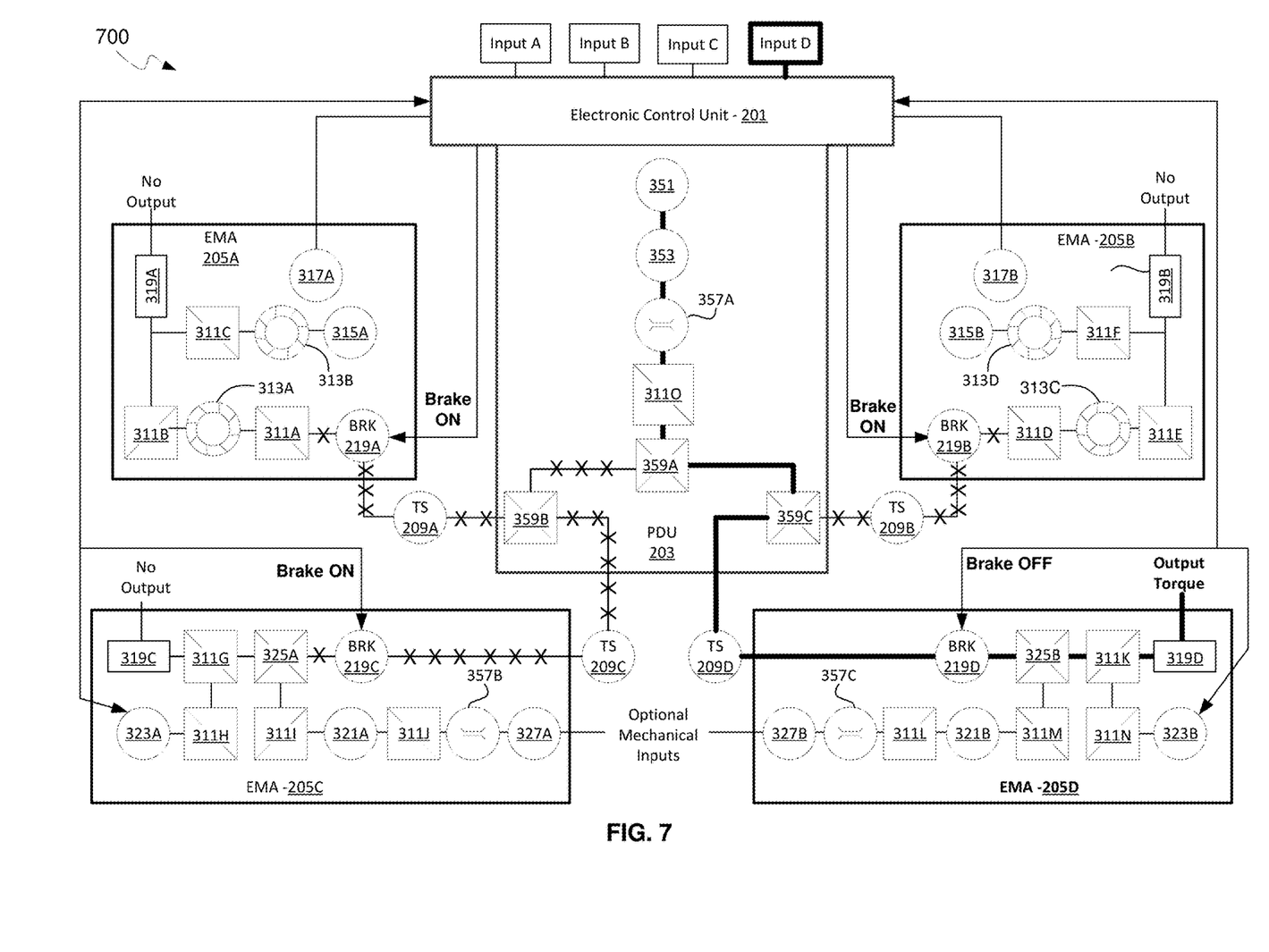
FIG. 7 illustrates the activation of a fourth electromechanical actuator, in accordance with an example embodiment of the disclosure.

FIG. 7 illustrates the activation of a fourth electromechanical actuator, in accordance with an example embodiment of the disclosure. Referring to FIG. 7, there is shown control system 700 with EMA 205D actuated. Input D is highlighted, indicating that it has been selected by a user through a touchscreen or push button, for example. This activation indicates to the electronic control unit 201 to activate the motor 353 and also to engage/disengage the appropriate brakes 219A-219D.

The brake activation/deactivation is illustrated by the Brake ON or Brake OFF on each of the lines to the brakes 219A-219D, where the brake 219D is disengaged while brakes 219A-219C are engaged by appropriate signals from the electronic control unit 201 as shown. In this state, both legs of differential gear 359B, the left leg of differential gear 359A, and the right leg of brake 359C are grounded so that torque from the motor 353 is supplied to the EMA 205D via the left leg of differential gear 359C and the torque shaft 209D, as indicated by the bold lines in and between the PDU 203 and EMA 205D, indicating the path of supplied torque.

The gear ratio 311K and hybrid gearhead 325B configure the torque supplied to the ball screw 319D to the desired rotation speed and torque, while the resolver 323B determines the position of the ball screw 319D so that it is moved to a desired position. With the brakes 219A, 219B, and 219C engaged, no torque is supplied to the EMAs 205A, 205B, and 205C, as indicated by the X's in the lines in and between the PDU 203 and EMAs 205A, 205B, and 205C.

Figure 8:
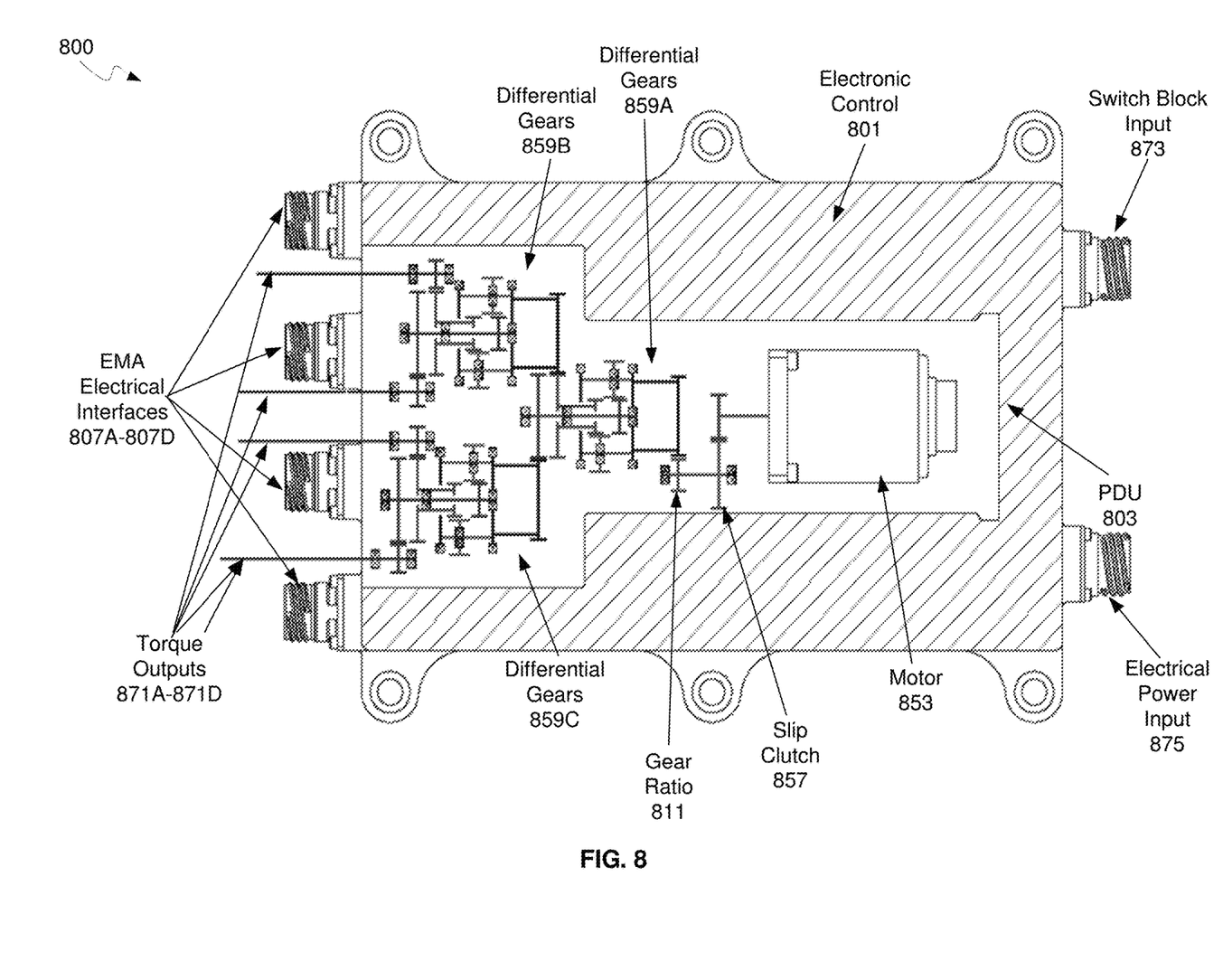
FIG. 8 is a cross-sectional view of a power distribution unit, in accordance with an example embodiment of the disclosure.

FIG. 8 is a cross-sectional view of a power distribution unit, in accordance with an example embodiment of the disclosure. Referring to FIG. 8, there is shown PDU/ECU 800 showing PDU 803 coupled to ECU 801. The ECU/PDU 800 comprises ECU 801 and PDU 803 with EMA electrical interfaces 807A-807D, gear ratio 811, motor 853, slip clutch 857, differential gears 859A-859C, torque outputs 871A-871D, switch block input 873, and electrical power input 875.

The ECU 801, PDU 803, gear ratio 811, motor 853, slip clutch 857, differential gears 859A-859C may be similar to the ECU 201, PDU 203, gear ratio 3110, motor 353, slip clutch 357A, and differential gears 359A-359C described with respect to FIGS. 3-7. The EMA electrical interfaces 807A-807D may comprise electrical connectors for communicating electrical signals between the PDU 803 and the EMAs, for example, providing electrical signals to power-on and power-off brakes and receiving signals from limit switches and resolvers in the EMAs.

The torque outputs 871A-871D may comprise flex shaft interfaces, for example, for transferring torque from the PDU 803 to the EMUs via torque shafts. The switch block input 873 may comprise an electrical interconnect for coupling electrical signals from a switch array or touchscreen interface, for example. The electrical power input 875 may comprise an electrical interconnect for supplying power to the PDU/ECU 800.

Figure 9:
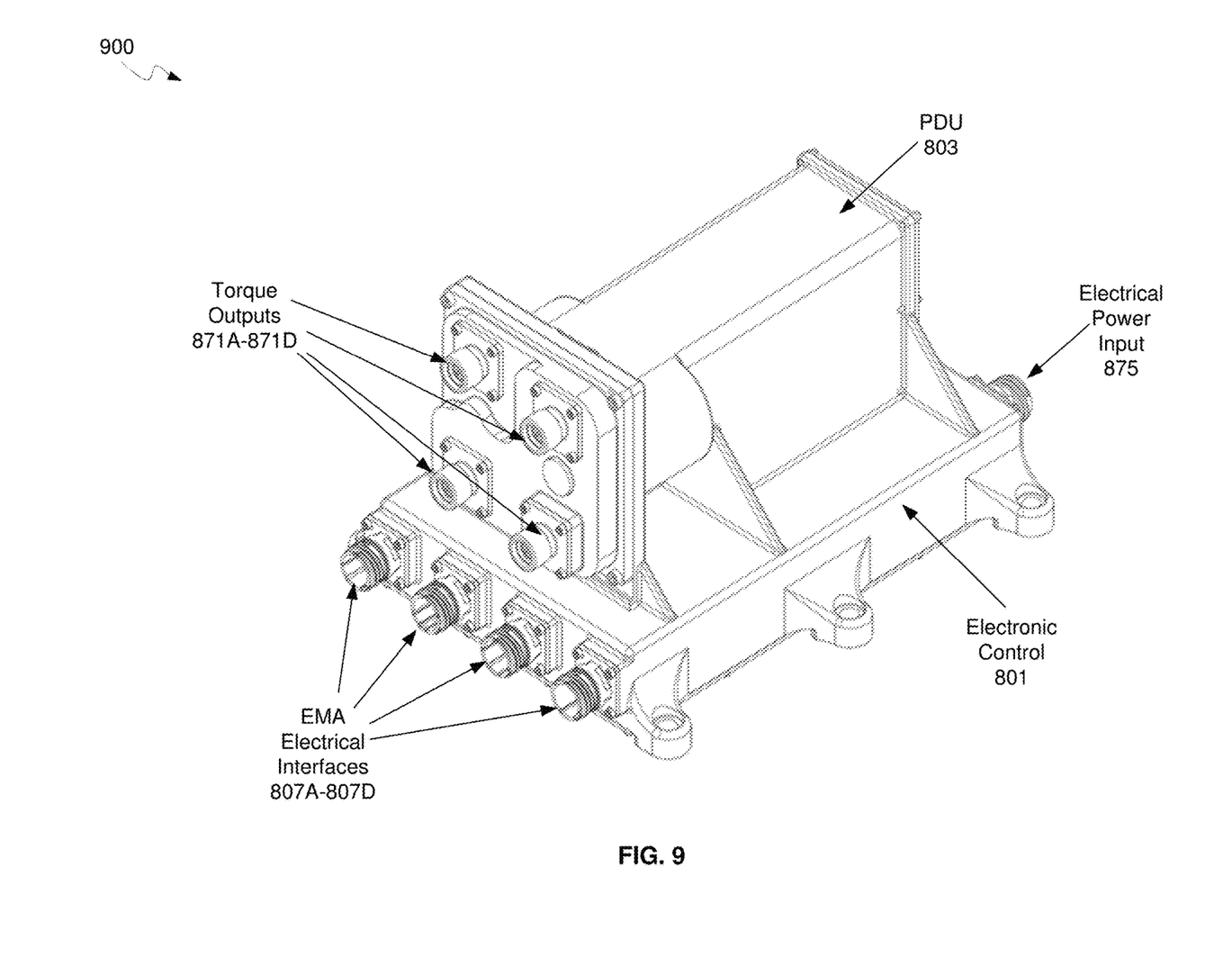
FIG. 9 is an oblique angle view of a power distribution unit and electronic control unit, in accordance with an example embodiment of the disclosure.

FIG. 9 is an oblique angle view of a power distribution unit and electronic control unit, in accordance with an example embodiment of the disclosure. Referring to FIG. 9, there is shown ECU/PDU 900 which comprises ECU 801 and PDU 803 with EMA electrical interfaces 807A-807D, gear ratio 811, motor 853, slip clutch 857, differential gears 859A-859C, torque outputs 871A-871D, and electrical power input 875.

Certain aspects of the disclosure may be found in a method and system for a geared rotary power distribution unit with mechanical differential gearing for multiple actuator systems. Exemplary aspects of the disclosure may comprise a power distribution unit comprising a motor and differential gears; and a plurality of electromechanical actuators, each coupled to an output of a corresponding one of said differential gears. Each of the electromechanical actuators may comprise a configurable brake and a mechanical output, where the power distribution unit may provide mechanical torque to one of the electromechanical actuators via the motor and the differential gears based on configuration of the configurable brakes in each of the electromechanical actuators. The mechanical torque may be provided to the one or more of the electromechanical actuators via a torque shaft or a flex shaft.

At least one of the configurable brakes may be an electrically configurable brake. At least one of the configurable brakes may be a mechanically configurable brake. The differential gears may comprise two or more differential gears for receiving an input torque and supplying an output torque to one of a plurality of outputs of the differential gears. The mechanical output of each of the electromechanical actuators may comprise a rotary or linear output.

At least one of the electromechanical actuators may comprise a power-on brake or a power-off brake. The differential gears may comprise epicyclic gearing. The power distribution unit may comprise a slip clutch for configuring a torque provided to the one of the electromechanical actuators. The electromechanical actuators may open cowls of a nacelle. The motor may comprise an electrical, hydraulic, or pneumatic motor. In the case of an electric motor, the motor may comprise a brushless DC motor, a brushed DC motor, an AC Induction motor, or a stepper motor.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system for electromechanical actuation, the system comprising:
   a power distribution unit enclosed within a single housing, the power distribution unit comprising:
   a motor;
   a primary differential gear connected at a first end to an output of the motor; and
   two or more secondary differential gears connected to one or more outputs at a second end of the primary differential gear opposite the first end; and a plurality of electromechanical actuators, each coupled to an output of a corresponding one of said two or more secondary differential gears opposite the primary differential gear, wherein each of the electromechanical actuators comprising an input, a configurable brake, a mechanical output shaft, and a gear ratio between the configurable brake and the mechanical output shaft, wherein said power distribution unit is operable to provide mechanical torque to one or more of said electromechanical actuators via said motor, said primary differential gear, and said two or more secondary differential gears based on configuration of said configurable brakes in each of said electromechanical actuators.

2. The system according to claim 1, wherein said mechanical torque is provided to said one or more of said electromechanical actuators via a torque shaft or a flex shaft.

3. The system according to claim 1, wherein at least one of said configurable brakes is a mechanically configurable brake or an electrically configurable brake.

4. The system according to claim 1, wherein said two or more secondary differential gears are configured to receive an input torque from the one or more outputs of the primary differential gear and supplying an output torque to the output of a corresponding one of said two or more secondary differential gears.

5. The system according to claim 1, wherein said mechanical output of each of said electromechanical actuators comprises a rotary or linear output.

6. The system according to claim 1, wherein at least one of said electromechanical actuators comprises a power-on brake or a power-off brake.

7. The system according to claim 1, wherein said primary or secondary differential gears comprise epicyclic gearing.

8. The system according to claim 1, wherein the power distribution unit comprises a slip clutch for configuring a torque provided to the one of the electromechanical actuators.

9. The system according to claim 1, wherein said electromechanical actuators open cowls of a nacelle.

10. The system according to claim 1, wherein said motor comprises an electrical, hydraulic, or pneumatic motor.

11. A method for electromechanical actuation, the method comprising:
in a control system comprising a power distribution unit comprising a motor and differential gears, and a plurality of electromechanical actuators, each electromechanical actuator coupled to an output of a corresponding one of said differential gears with each of the electromechanical actuators comprising an input, a configurable brake, and a mechanical output shaft,
wherein the differential gears include a primary differential gear connected at a first end to an output of the motor, two or more secondary differential gears connected to one or more outputs of the primary differential gear at a second end opposite the first end, the power distribution unit being enclosed within a single housing:

disengaging a first configurable brake to activate a first electromechanical actuator of the plurality of electromechanical actuators;
engaging a second configurable brake to deactivate a second electromechanical actuator of the plurality of electromechanical actuators; and
providing mechanical torque to at least the first electromechanical actuator from said power distribution unit via said motor and said differential gears based on configuration of said configurable brakes in each of said electromechanical actuators.

12. The method according to claim 11, wherein said mechanical torque is provided to said one or more of said electromechanical actuators via a torque shaft or a flex shaft.

13. The method according to claim 11, wherein at least one of said configurable brakes is a mechanically configurable brake or an electrically configurable brake.

14. The method according to claim 11, wherein said mechanical output of each of said electromechanical actuators comprises a rotary or linear output.

15. The method according to claim 11, wherein at least one of said electromechanical actuators comprises a power-on brake or a power-off brake.

16. The method according to claim 11, wherein said differential gears comprise epicyclic gearing.

17. The method according to claim 11, wherein the power distribution unit comprises a slip clutch for configuring a torque provided to one of the electromechanical actuators.

18. The method according to claim 11, wherein said motor comprises a brushless DC motor, a brushed DC motor, an AC Induction motor, or a stepper motor.

19. A system for electromechanical actuation, the system comprising:
a power distribution unit enclosed within a single housing, the power distribution unit comprising:
a motor,
a slip clutch,
a primary differential gear connected at a first end to an output of the motor,
two or more secondary differential gears connected to one or more outputs at a second end of the primary differential gear opposite the first end,
wherein the power distribution unit is coupled to a plurality of electromechanical actuators, each coupled to an output of a corresponding one of said two or more secondary differential gears opposite the primary differential gear, each of the electromechanical actuators comprising an input, a configurable brake, and a mechanical output shaft, wherein said power distribution unit is operable to provide mechanical torque configured by said slip clutch to one of said electromechanical actuators via said motor and said differential gears based on configuration of said configurable brake in each of said electromechanical actuators,
wherein an output of the differential gears of the power distribution unit is provided to each electromechanical actuator having a disengaged configurable brake.

* * * * *